(12) United States Patent
Tamura

(10) Patent No.: US 11,654,878 B2
(45) Date of Patent: May 23, 2023

(54) CONTROL DEVICE FOR VEHICULAR TRANSFER

(71) Applicant: Hitachi Astemo, Ltd., Hitachinaka (JP)

(72) Inventor: Tetsuro Tamura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/438,730

(22) PCT Filed: May 20, 2020

(86) PCT No.: PCT/JP2020/019924
§ 371 (c)(1),
(2) Date: Sep. 13, 2021

(87) PCT Pub. No.: WO2020/235590
PCT Pub. Date: Nov. 26, 2020

(65) Prior Publication Data
US 2022/0126809 A1 Apr. 28, 2022

(30) Foreign Application Priority Data

May 20, 2019 (JP) .............................. JP2019-094784

(51) Int. Cl.
*B60W 10/02* (2006.01)
*B60K 17/348* (2006.01)
(Continued)

(52) U.S. Cl.
CPC .......... *B60W 10/02* (2013.01); *B60K 17/348* (2013.01); *B60W 30/188* (2013.01); *B60W 40/10* (2013.01); *B60W 40/12* (2013.01)

(58) Field of Classification Search
CPC .... B60W 10/02; B60W 10/119; B60W 10/14; B60W 30/188; B60W 40/10; B60W 40/12; B60K 17/348; F16D 48/06
See application file for complete search history.

(56) References Cited

U.S. PATENT DOCUMENTS

| 2007/0251345 | A1 | 11/2007 | Kriebernegg et al. |
| 2008/0211433 | A1* | 9/2008 | Matsuzaki ............. B60K 6/442 |
| | | | 180/65.285 |

(Continued)

FOREIGN PATENT DOCUMENTS

| JP | 2010-64653 A | 3/2010 |
| JP | 2019-18692 A | 2/2019 |
| WO | WO 2008/096438 A1 | 8/2008 |

OTHER PUBLICATIONS

International Preliminary Report on Patentability (PCT/IB/338 & PCT/IB/373) issued in PCT Application No. PCT/JP2020/019924 dated Dec. 2, 2021, Including English translation of document C2 (Japanese-language Written Opinion (PCT/ISA/237), filed on Sep. 13, 2021) (seven (7) pages).

(Continued)

*Primary Examiner* — Edwin A Young
(74) *Attorney, Agent, or Firm* — Crowell & Moring LLP

(57) ABSTRACT

A transfer (13) that changes a distribution ratio of torque to be transmitted to a wheel using an electric motor (43), is controlled by a TF-ECU (18). The TF-ECU (18) includes a driver circuit (200) that drives the electric motor (43), a current sensor (53) that detects an actual current of the electric motor (43), and a microcomputer (100) that calculates a target current (I*) corresponding to a desired distribution ratio of torque and performs current feedback control for calculating an operation amount (D) of the electric motor (43) so as to adjust an actual current (Ia) to the target current (I*), and then outputs to the driver circuit (200) a drive signal corresponding to the operation amount (D).

11 Claims, 12 Drawing Sheets

(51) Int. Cl.
*B60W 30/188* (2012.01)
*B60W 40/10* (2012.01)
*B60W 40/12* (2012.01)

(56) References Cited

U.S. PATENT DOCUMENTS

2010/0100294 A1 4/2010 Hirao et al.
2017/0023075 A1* 1/2017 Nozu .................. F16D 25/14
2018/0361851 A1* 12/2018 Nozu ................ B60K 17/3515
2019/0017557 A1 1/2019 Arai et al.

OTHER PUBLICATIONS

International Search Report (PCT/ISA/210) issued in PCT Application No. PCT/JP2020/019924 dated Jun. 23, 2020 with English translation (five (5) pages).
Japanese-language Written Opinion (PCT/ISA/237) issued in PCT Application No. PCT/JP2020/019924 dated Jun. 23, 2020 (three (3) pages).

* cited by examiner

CONTROL DEVICE FOR VEHICULAR TRANSFER

TECHNICAL FIELD

The present invention relates to a control device for a vehicular transfer (transfer case) which changes a distribution ratio of torque to be distributed from a clutch to a predetermined wheel by changing a pressing force with which the clutch is pressed by a rotary output shaft of a reducer driven by an electric motor.

BACKGROUND ART

For example, a control device for a vehicular transfer is disclosed in Patent Document 1. This device detects the shaft angle of the rotary output shaft of the reducer using a rotation angle sensor and drives the electric motor so as to adjust the shaft angle to a target angle corresponding to a desired torque distribution ratio.

REFERENCE DOCUMENT LIST

Patent Document

Patent Document 1: U.S. Patent Application Publication No. 2007/0251345

SUMMARY OF THE INVENTION

Problem to be Solved by the Invention

Here, the rotary output shaft of the reducer has smaller rotation variations than the electric motor. Thus, in the case of using PID control for the above position feedback control and calculating the differential term, the rotation angle sensor may not precisely detect shaft angle variations depending on its detection capability, and precision may become lower in calculating the differential term. To address this, the motor angle of the electric motor detected by a motor angle sensor may be used to calculate the differential term in the PID control.

However, if the motor angle sensor is used, the control device needs to perform high-load interrupt processing for reading, or reducing the noise of, a pulse signal output from the motor angle sensor, for example. In order to reduce a control processing load on the control device, one possible solution is not to use the motor angle sensor or not to calculate the differential term itself, but in such case, the shaft angle may overshoot a target angle and the responsiveness of the transfer may be reduced.

In view of the above problem, it is an object of the present invention to provide a control device for a vehicular transfer which reduces a control processing load while suppressing reductions in the responsiveness of the transfer.

Means for Solving the Problem

In order to achieve the above object, the present invention provides a control device for a vehicular transfer which changes a distribution ratio of torque to be distributed from a clutch to a predetermined wheel by changing a pressing force with which the clutch is pressed by a rotary output shaft of a reducer driven by an electric motor, the control device including: a driver circuit that drives the electric motor; a current sensor that detects an actual current of the electric motor; and a control circuit that calculates, when the distribution ratio is newly set or is changed, a holding current, as a target current, that is required to be supplied to the electric motor to maintain the distribution ratio and performs current feedback control by calculating an operation amount of the electric motor so as to adjust the actual current to the target current, and then outputs to the driver circuit a drive signal corresponding to the operation amount.

Effects of the Invention

According to the control device for a vehicular transfer of the present invention, it is possible to reduce the control processing load while suppressing reductions in the responsiveness of the transfer.

MODE FOR CARRYING OUT THE INVENTION

Embodiment 1

Figure 1:
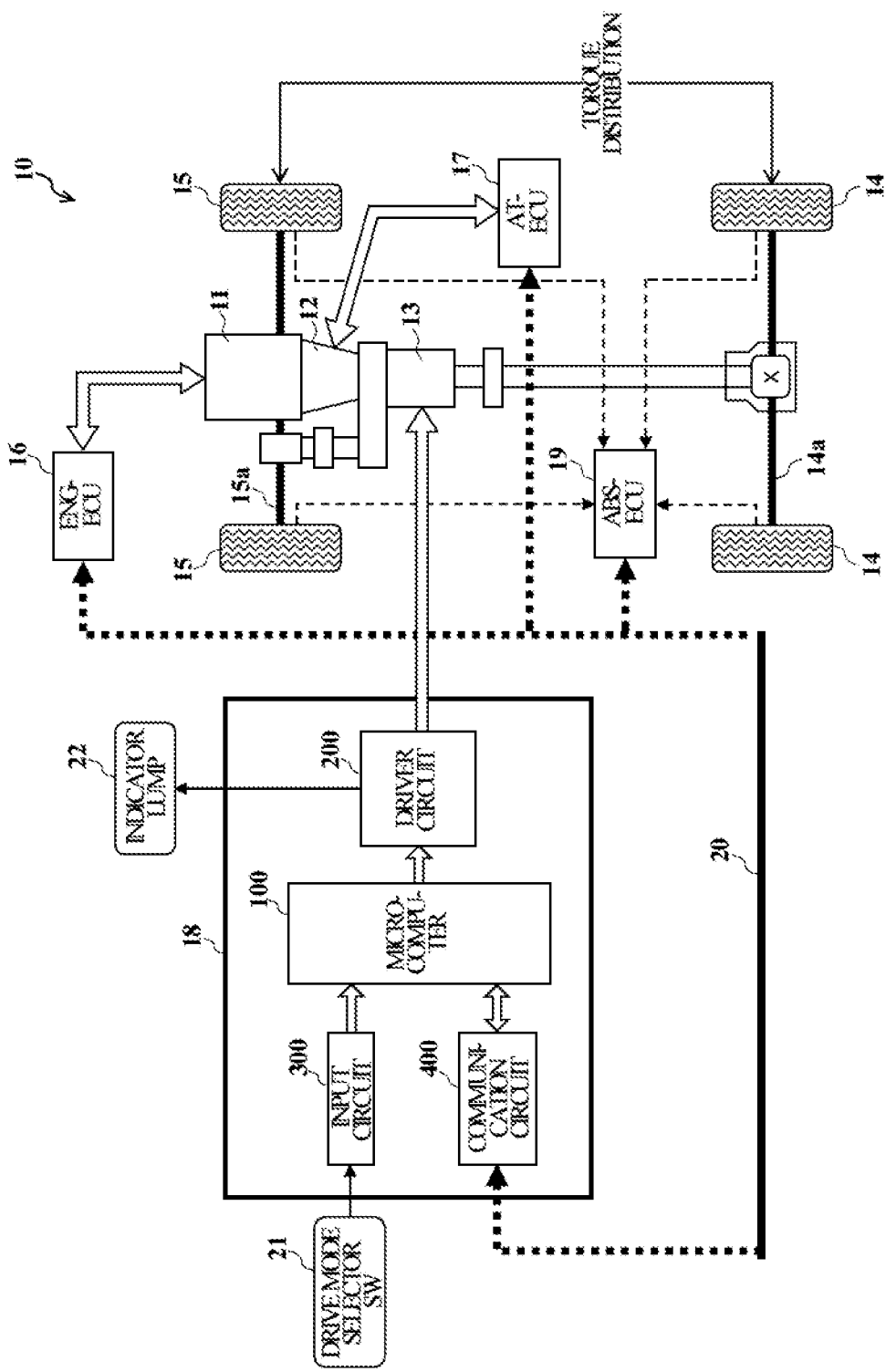
FIG. 1 is a schematic diagram illustrating an example of a transfer system according to Embodiment 1.

Referring to the accompanying drawings, Embodiment 1 of the present invention will be described in detail below. FIG. 1 schematically illustrates a transfer system including a control device for a vehicular transfer (transfer case). An output torque of an engine 11 mounted on a vehicle 10 is transmitted to a gearbox 12, and an output torque of gearbox 12 is transmitted to a transfer 13.

Transfer 13 is configured not only to transmit the output torque of gearbox 12 to rear wheels 14 via a rear wheel axle 14a but also to distribute and transmit the torque to front wheels 15 via a front wheel axle 15a according to a drive mode being a wheel driving system. That is, transfer 13 has a function of changing the two transmission torques to be transmitted to front wheels 15 and rear wheels 14, that is, changing a front/rear-wheel distribution ratio in percentage of the output torque of gearbox 12 from almost 0:100 (rear-wheel drive state) to about 50:50 (four-wheel drive state). Specifically, transfer 13 can change the front/rear-wheel torque distribution ratio by changing the engagement of a clutch that transmits the torque to front wheels 15 based on a rotation output of a built-in electric motor, as described below.

Engine 11 is controlled by an electronic control unit (ENG-ECU) 16 for engine control. Gearbox 12 is controlled by an electronic control unit (AT-ECU) 17 for gearbox control. Transfer 13 is controlled by an electronic control unit (TF-ECU) 18 for transfer control. Moreover, an electronic control unit (ABS-ECU) 19 for an antilock brake system (ABS) is provided, which controls braking of each wheel. Here, ENG-ECU 16, AT-ECU 17, TF-ECU 18, and ABS-ECU 19 are communicably connected to one another via an in-vehicle communication line 20 such as a control area network (CAN).

TF-ECU 18 includes a microcomputer 100 including a central processing unit (CPU) or other processor, a flash read only memory (ROM) or other nonvolatile memory, and a random access memory (RAM) or other volatile memory. TF-ECU 18 further includes, for example, a driver circuit 200 for driving the electric motor or other component as described below, an input circuit 300, and a communication circuit 400.

TF-ECU 18 receives, via input circuit 300, a drive mode signal that is output from a drive mode selector switch 21 for switching drive modes. TF-ECU 18 also receives, via communication circuit 400, various kinds of vehicle information from ENG-ECU 16, AT-ECU 17, and ABS-ECU 19. Microcomputer 100 executes a control program for transfer 13 read from an internal (or external) nonvolatile memory, to control transfer 13 via driver circuit 200 according to a drive mode corresponding to the drive mode signal. Microcomputer 100 also controls on/off of an indicator light 22 indicating an operation state (e.g., drive mode) of transfer 13, via driver circuit 200.

Then, microcomputer 100 calculates a front-wheel torque distribution ratio (hereinafter referred to as "target torque distribution ratio") of transmission torque to be distributed to front wheels 15 based on various kinds of vehicle information in a predetermined drive mode (AUTO mode described later). Examples of the various kinds of vehicle information include the vehicle speed of vehicle 10, the slip amounts of rear wheel 14 and front wheel 15, the output torque of engine 11, and the shift position (gear ratio) of gearbox 12.

Figure 2:
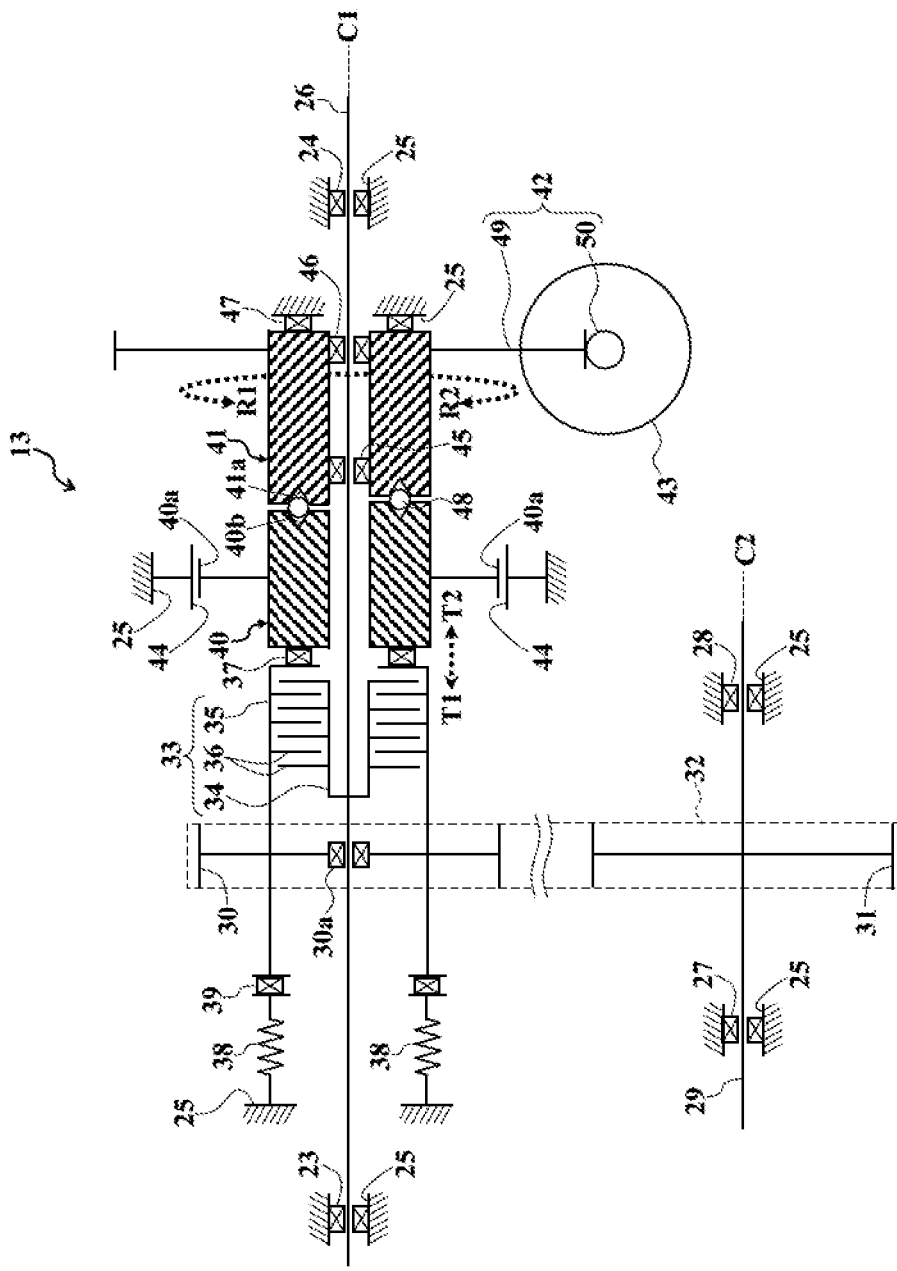
FIG. 2 is a schematic diagram illustrating the schematic configuration of an example of a transfer according to Embodiment 1.

FIG. 2 illustrates the schematic configuration of an example of transfer 13. Transfer 13 includes a rear wheel side output shaft 26 and a front wheel side output shaft 29. Rear wheel side output shaft 26 is rotatably supported to a transfer case 25 as a non-rotating member by means of bearings 23, 24. Front wheel side output shaft 29 is rotatably supported to transfer case 25 by means of bearings 27, 28. Rear wheel side output shaft 26 is connected, at one end, to an output shaft of gearbox 12 via a joint or other member to rotate on a first axial line C1 as a rotational axis. Rear wheel side output shaft 26 is also connected, at the other end, to a rear wheel axle 14a via a propeller shaft or other member to output power thereto, so as to transmit the power to rear wheels 14. Front wheel side output shaft 29 receives from rear wheel side output shaft 26 power distributed by a power distribution mechanism as described below, and thus rotates on a second axial line C2 as a rotation axis, which is offset from (and is parallel to) first axial line C1. With this structure, front wheel side output shaft 29 outputs power to front wheel axle 15a connected via a propeller shaft or other member so as to transmit the power to front wheels 15.

The power distribution mechanism includes a drive gear 30, a driven gear 31, a power transmission chain 32, and a clutch 33.

Drive gear 30 is supported rotatably relative to rear wheel side output shaft 26 by means of a bearing 30a, to rotate about first axial line C1. Driven gear 31 is coupled non-rotatably relative to front wheel side output shaft 29, to rotate about second axial line C2 integrally with front wheel side output shaft 29. Power transmission chain 32 is wound between drive gear 30 and driven gear 31, to allow power transmission from drive gear 30 to driven gear 31.

Clutch 33 is a multi-plate friction clutch for adjusting torque to be transmitted from rear wheel side output shaft 26 to drive gear 30, and includes a clutch hub 34, a clutch drum 35, and frictional engagement elements 36.

Clutch hub 34 is a cylindrical or bar-like member that is coupled non-rotatably relative to rear wheel side output shaft 26. Clutch hub 34 rotates about first axial line C1 integrally with rear wheel side output shaft 26. Clutch drum 35 is a cylindrical member that surrounds, at some distance, an outer peripheral surface of clutch hub 34 around the first axial line C1. Clutch drum 35 is supported relative to drive gear 30 immovably about first axial line C1 and also movably in the direction of first axial line C1. To clutch drum 35, a linearly moving member described later comes into contact via a thrust bearing 37 from a direction T2 that is one direction of first axial line C1. To transfer case 25, a biasing member 38 for biasing clutch drum 35 toward direction T2, such as a spring, is fixed, and clutch drum 35 is in contact with biasing member 38 via a thrust bearing 39.

Frictional engagement elements 36 are alternately fixed to clutch hub 34 and clutch drum 35 in the direction of first axial line C1 at the gap between clutch hub 34 and clutch drum 35 in a radial direction of first axial line C1. When clutch drum 35 moves relative to clutch hub 34 in the direction of first axial line C1, frictional engagement element 36 fixed to clutch drum 35 is pressed and engaged with frictional engagement element 36 fixed to clutch hub 34 so as to generate frictional force. The engagement of clutch hub 34 and clutch drum 35 allows power transmission from rear wheel side output shaft 26 to drive gear 30. Depending on the intensity of the force (pressing force) at which frictional engagement element 36 of clutch drum 35 presses frictional engagement element 36 of clutch hub 34, the frictional force changes and thus power to be transmitted from rear wheel side output shaft 26 to drive gear 30 changes.

Clutch 33 is driven by a clutch drive mechanism. The clutch drive mechanism includes a linearly moving member 40, a clutch shaft 41, a reducer 42, and an electric motor 43 capable of rotating forward and backward.

Linearly moving member 40 is a cylindrical member that is movable relative to rear wheel side output shaft 26 in the direction of first axial line C1, and rear wheel side output shaft 26 is inserted therethrough. Specifically, transfer case 25 has a plurality of guide rails 44 extending in the direction of first axial line C1, and linearly moving member 40 includes sliding portions 40a that slide along guide rails 44. With sliding portions 40a sliding along guide rails 44, linearly moving member 40 is supported to transfer case 25 non-rotatably about first axial line C1 and also movably relative to rear wheel side output shaft 26 in the direction of first axial line C1. As described above, clutch drum 35 is in contact with linearly moving member 40 from a direction T1 via thrust bearing 37.

Clutch shaft 41 is a cylindrical member that is supported relative to rear wheel side output shaft 26 rotatably about first axial line C1 by means of bearings 45, 46. Clutch shaft 41 corresponds to a rotary output shaft of reducer 42. Transfer case 25 is in contact with clutch shaft 41 from direction T2 via thrust bearing 47, and linearly moving member 40 faces clutch shaft 41 from direction T1.

An opposing surface of linearly moving member 40 against clutch shaft 41 has an inclined groove 40b that extends in a circumferential direction around first axial line C1 and continuously changes its position in the direction of first axial line C1 according to an angular position around first axial line C1. An opposing surface of clutch shaft 41 against linearly moving member 40 has an inclined groove 41a that is spaced by a given distance from inclined groove 40b of linearly moving member 40 in the direction of first axial line C1. Between inclined grooves 40b and 41a, a ball-like rolling member 48 is inserted. Linearly moving member 40 and clutch shaft 41 come into contact via ball-like rolling member 48.

When clutch shaft 41 rotates in a direction R1, linearly moving member 40 moves in direction T1 by means of a cam action obtained between inclined groove 40b and inclined groove 41a via ball-like rolling member 48. When clutch shaft 41 rotates in direction R2, linearly moving member 40 moves in direction T2 through the above cam action.

Reducer 42 is a worm drive configured by two gear wheels with crossed worm shafts, that is, a worm wheel 49 and a mating worm 50. Worm wheel 49 is formed on the outer peripheral surface of clutch shaft 41 around first axial line C1. Worm wheel 49 rotates about first axial line C1 integrally with clutch shaft 41. Worm 50 is coupled concentrically to the output shaft of electric motor 43. Regarding reducer 42, the lead angle of worm grooves is set so as to avoid a situation (i.e., self-locking) in which worm wheel 49 stops rotation of worm 50. Accordingly, even if no current is supplied to electric motor 43, with the biassing force of biasing member 38 being applied to linearly moving member 40 in direction T2, clutch shaft 41 can rotate in direction R2 until linearly moving member 40 reaches a limit position in direction T2.

Transfer 13 is configured so that, when linearly moving member 40 reaches the limit position in direction T2, frictional engagement element 36 of clutch hub 34 is separated from frictional engagement element 36 of clutch drum 35, to disengage clutch 33.

When electric motor 43 is rotated forward and clutch shaft 41 is rotated in direction R1 with clutch 33 being disengaged, linearly moving member 40 moves in direction T1. As a result, clutch drum 35 moves toward direction T1 against the biasing force of biasing member 38 to bring frictional engagement elements 36 of both of clutch hub 34 and clutch drum 35 close to each other. Then, when frictional engagement element 36 of clutch drum 35 begins to press and engage with frictional engagement element 36 of clutch hub 34, clutch 33 is engaged.

In addition, when electric motor 43 is rotated backward to rotate clutch shaft 41 in direction R2 with clutch 33 being engaged, linearly moving member 40 moves toward direction T2. As a result, clutch drum 35 moves in direction T2, so that the pressing force of frictional engagement element 36 of clutch drum 35 with respect to frictional engagement element 36 of clutch hub 34 is decreased. Then, when frictional engagement element 36 of clutch drum 35 is disengaged from frictional engagement element 36 of clutch hub 34, clutch 33 is disengaged.

In the engaged state of clutch 33, that is, in a state in which frictional engagement element 36 of clutch drum 35 presses and engages with frictional engagement element 36 of clutch hub 34, the rotation angle of clutch shaft 41 is proportional to the front-wheel torque distribution ratio. Hence, the rotation angle of clutch shaft 41 corresponding to the front-wheel torque distribution ratio can be calculated.

Figure 3:
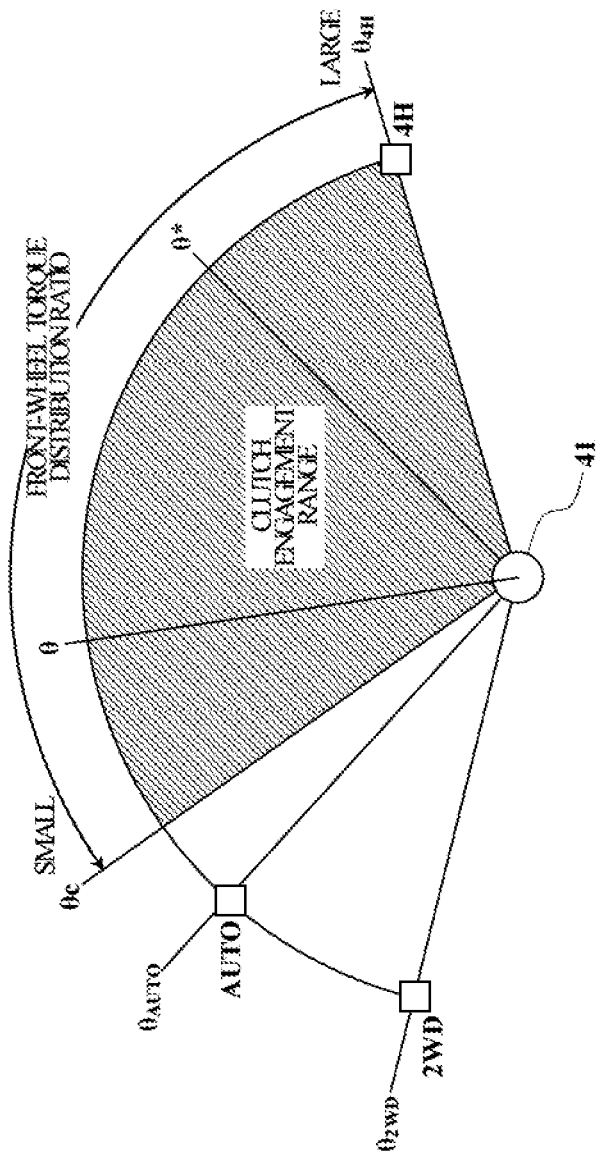
FIG. 3 is a schematic diagram illustrating an example of a drive mode of the transfer according to Embodiment 1.

FIG. 3 illustrates a correlation between a drive mode of transfer 13 and a rotation angle θ of clutch shaft 41. The drive mode of transfer 13 includes a 2WD mode, a 4H mode, and the AUTO mode.

The 2WD mode is a drive mode in which clutch 33 is disengaged to enter a rear-wheel drive state with a front/rear-wheel torque distribution ratio of 0:100, which is a ratio of the transmission torque for front wheels 15 to the transmission torque for rear wheels 14. In the 2WD mode, rotation angle θ of clutch shaft 41 is maintained at a predetermined angle $\theta_{2WD}$. In Embodiment 1, it is assumed that when rotation angle θ of clutch shaft 41 is predetermined angle $\theta_{2WD}$, linearly moving member 40 is at the above limit position in direction T2. When linearly moving member 40 is at the above limit position in direction T2, linearly moving member 40 cannot move from the limit position toward direction T2 even if the biasing force of biasing member 38 is applied thereto, so that rotation angle θ of clutch shaft 41 is maintained at predetermined angle $\theta_{2WD}$. Hence, it is unnecessary to apply to clutch shaft 41 a holding torque for maintaining rotation angle θ of clutch shaft 41 at predetermined angle $\theta_{2WD}$, so that in the 2WD mode, a holding current required to generate the holding torque does not have to be supplied to electric motor 43.

The 4H mode is a drive mode in which clutch 33 is engaged to enter a four-wheel drive state with the front/rear-wheel torque distribution ratio of about 50:50, which is a ratio between the transmission torque for front wheels 15 and the transmission torque for rear wheels 14. In the 4H mode, rotation angle θ of clutch shaft 41 is maintained at predetermined angle $\theta_{4H}$ ($>\theta_{2WD}$). In the 4H mode, the biasing force of biasing member 38 and a pressing reaction force from clutch hub 34 are transmitted to clutch shaft 41. Hence, it is necessary to apply to clutch shaft 41 the holding torque for maintaining the rotation angle θ of clutch shaft 41 at predetermined angle $\theta_{4H}$, so that in the 4H mode, the holding current required to generate the holding torque is supplied to electric motor 43.

The AUTO mode is a drive mode in which the front-wheel torque distribution ratio can be successively changed from the rear-wheel drive state to the four-wheel drive state. In the AUTO mode, rotation angle θ of clutch shaft 41 changes in a range from predetermined angle $\theta_{AUTO}$ (where $\theta_{2WD}<\theta_{AUTO}<\theta_{4H}$) to predetermined angle $\theta_{4H}$. In this range, when clutch shaft 41 rotates from predetermined angle $\theta_{AUTO}$ to predetermined angle θc (where $\theta_{AUTO}<\theta c<\theta_{4H}$), clutch 33 is engaged. In this case, an engagement range of clutch 33 is from predetermined angle θc to predetermined angle $\theta_{4H}$ (hatched portion of FIG. 3). As clutch shaft 41 rotates from predetermined angle θc toward predetermined angle $\theta_{AUTO}$, the front-wheel torque distribution ratio increases in proportion to a difference between rotation angle θ of clutch shaft 41 and predetermined angle θc.

In the AUTO mode, in the engagement range of clutch 33, the biasing force of biasing member 38 and the pressing reaction force from clutch hub 34 are transmitted to clutch shaft 41. It is accordingly necessary to apply to clutch shaft 41 the holding torque for maintaining rotation angle θ of clutch shaft 41 at a target angle θ* corresponding to the target torque distribution ratio within the engagement range of clutch 33. Hence, in the AUTO mode, the holding current required to generate the holding torque is supplied to electric motor 43.

Here, for detailed explanation about the problem to be solved by the present invention, how a conventional TF-ECU 18z with a microcomputer 1000, instead of microcomputer 100, controls transfer 13 is described.

Figure 13:
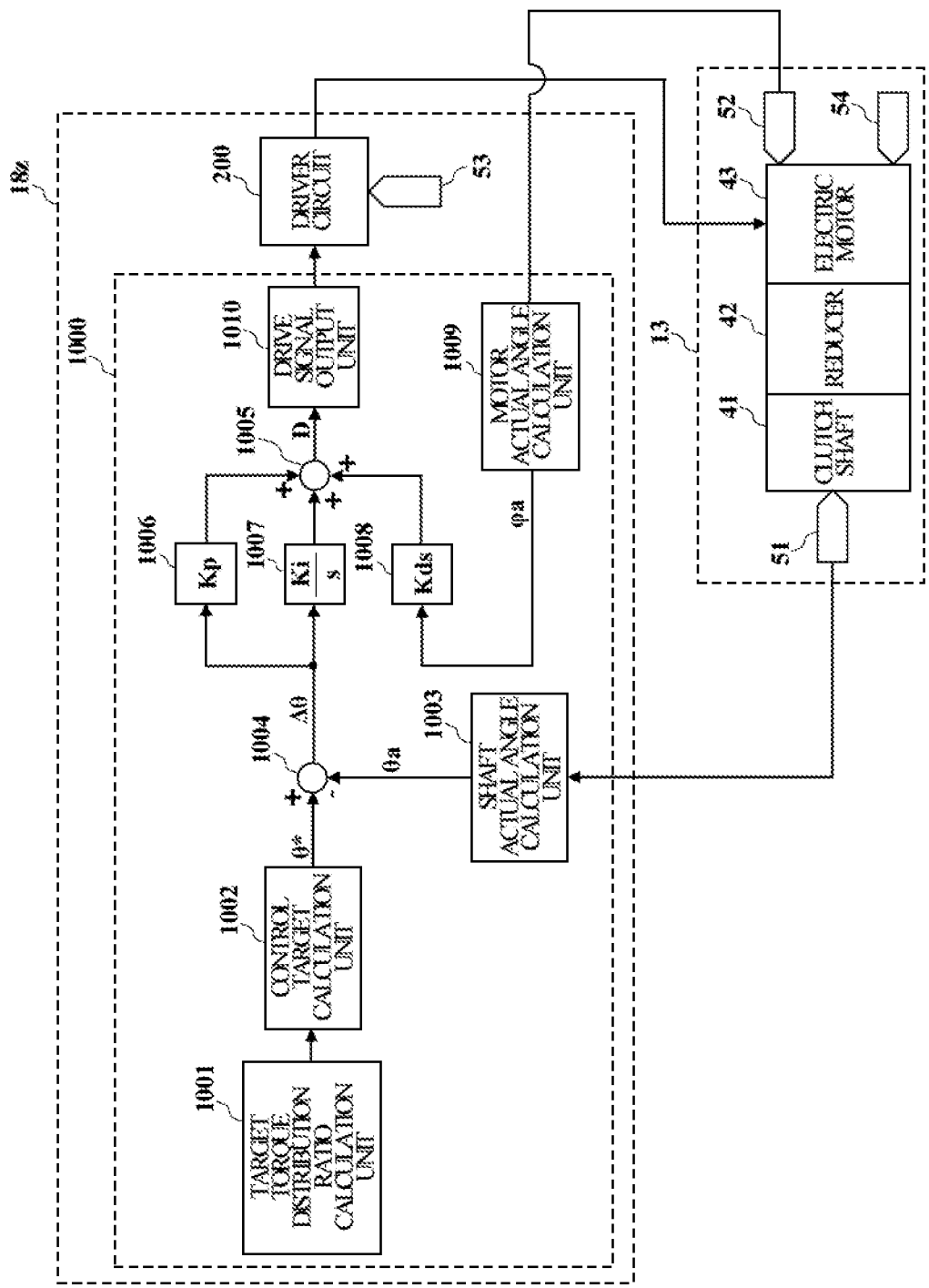
FIG. 13 is a functional block diagram of a conventional microcomputer.

FIG. 13 schematically illustrates functional blocks for transfer control of microcomputer 1000 in conventional TF-ECU 18z. According to the conventional transfer control, clutch shaft 41 is rotated by driving electric motor 43 via driver circuit 200 so as to bring an actual rotation angle (hereinafter referred to as "actual angle") θa of clutch shaft 41 closer to target angle θ* of clutch shaft 41 through the position feedback control.

In microcomputer 1000, a target torque distribution ratio calculation unit 1001 calculates a target torque distribution ratio based on the various kinds of vehicle information as described above. A control target calculation unit 1002 calculates, as target angle θ*, rotation angle θ of clutch shaft 41 corresponding to a target torque distribution ratio based on a proportional relationship between rotation angle θ of clutch shaft 41 and the front-wheel torque distribution ratio. A shaft actual angle calculation unit 1003 calculates actual angle θa of clutch shaft 41 based on an output signal of a shaft angle sensor 51 for detecting actual angle θa of clutch shaft 41. A subtraction unit 1004 calculates a deviation Δθ between target angle θ* and actual angle θa.

Basically, microcomputer 1000 executes PID control using deviation Δθ between target angle θ* of clutch shaft 41 and actual angle θa of clutch shaft 41 so as to calculate an operation amount D of electric motor 43. This control aims at satisfactory responsiveness and durability of transfer 13. An addition unit 1005 calculates operation amount D of electric motor 43 from the sum of the proportional term, the integral term, and the differential term obtained by the PID control. The proportional term is calculated by a proportional term calculation unit 1006 based on deviation Δθ, and the integral term is calculated by an integral term calculation unit 1007 based on deviation Δθ. However, the differential term is calculated by a differential term calculation unit 1008 not based on deviation Δθ for the following reason.

That is, the differential term has a value corresponding to variations between two deviations Δθ calculated in previous and current control periods in microcomputer 1000, in other words, variations between two actual angles θa calculated in previous and current control periods. However, clutch shaft 41 receives a rotation output transmitted from electric motor 43 via reducer 42, so that clutch shaft 41 has smaller rotation variations than electric motor 43. Hence, shaft angle sensor 51 may not precisely detect the variations of actual angle θa in each control period depending on its detection capability. This causes the risk of reducing the precision in calculating the differential term. If the precision in calculating the differential term is reduced, overshooting or hunting of actual angle θa may occur with respect to target angle θ*, leading to the reductions in the responsiveness and durability of transfer 13. To that end, in order to calculate the differential term, a motor actual angle calculation unit 1009 calculates the variations between two actual angles φa of electric motor 43 in previous and current control periods based on an output signal from a motor angle sensor 52 for detecting actual angle φa of electric motor 43. With this configuration, differential term calculation unit 1008 uses the variations between two actual angles φa calculated by motor actual angle calculation unit 1009 and a known reduction ratio of reducer 42, to calculate the differential term with the substantially higher detection capability for actual angle θa. This improves the precision in calculating the differential term.

A drive signal output unit 1010 generates a drive signal based on operation amount D calculated by addition unit 1005 and outputs it to driver circuit 200. Operation amount D is a parameter for changing a current flowing through electric motor 43. For example, if the drive signal is a pulse width modulation (PWM) signal, an on ratio (i.e., PWM duty ratio) per period of a PWM signal at the time of switching a semiconductor switch of driver circuit 200, a modulation ratio thereof, or other parameter can be used as operation amount D. If electric motor 43 is a brush motor, the operation amount may be a voltage value applied to a motor terminal. The same applies to operation amount D in TF-ECU 18.

For failure diagnosis of the transfer system, microcomputer 1000 is connected to a current sensor 53 and a temperature sensor 54. Current sensor 53 detects an actual current flowing through electric motor 43 at driver circuit 200. Temperature sensor 54 detects the temperature of electric motor 43.

If motor angle sensor 52 is used, microcomputer 1000 needs to perform high-load interrupt processing for detecting a rising edge of, and measuring a cycle of, a pulse signal output from motor angle sensor 52, or reducing the noise thereof, for example, at the time of reading the pulse signal. To that end, in view of reducing a control processing load on microcomputer 1000, one possible solution is not to use motor angle sensor 52 or not to calculate the differential term in the first place, but in either case, the responsiveness and durability of transfer 13 may be reduced.

In order to reduce the control processing load while suppressing reductions in the responsiveness and durability of transfer 13, microcomputer 100 of TF-ECU 18 adopts current feedback control to control transfer 13 as described below.

Figures 4A, 4B:
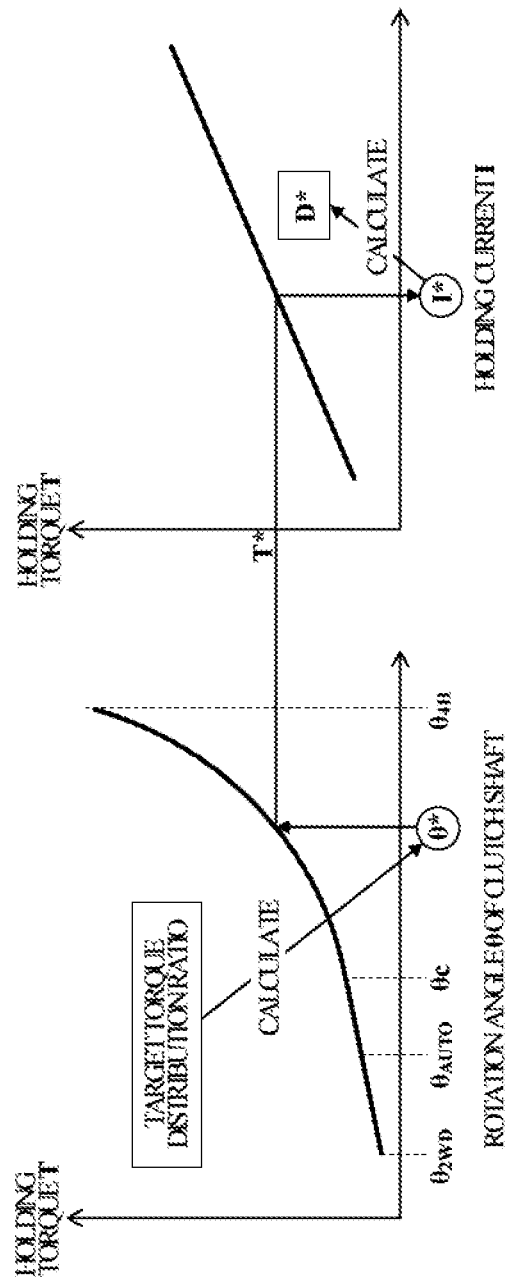
FIGS. 4A and 4B are explanatory graphs illustrating how to calculate a holding current according to Embodiment 1.

FIGS. 4A and 4B illustrate how to calculate a holding current that has to be supplied to electric motor 43 in order to maintain the target torque distribution ratio. FIG. 4A illustrates a correlation between rotation angle θ of clutch shaft 41 and a holding torque T required to maintain the same. FIG. 4B illustrates a correlation between holding torque T and a holding current I that has to be supplied to electric motor 43 in order to generate holding torque T.

Referring to FIG. 4A, when rotation angle θ of clutch shaft 41 is in a range from predetermined angle $θ_{2WD}$ to predetermined angle θc, rotation angle θ of clutch shaft 41 and holding torque T have a substantially proportional relationship. This is because when rotation angle θ of clutch shaft 41 is in a range from predetermined angle $θ_{2WD}$ to predetermined angle θc, clutch 33 is disengaged, so that the biasing force of biasing member 38 acts on clutch shaft 41 according to rotation angle θ. As rotation angle θ of clutch shaft 41 increases from predetermined angle θc to predetermined angle $θ_{4H}$, the pressing reaction force from clutch hub 34 increases in addition to the biasing force of biasing member 38. Consequently, the holding torque T increases to be greater than a proportion value corresponding to rotation angle θ of clutch shaft 41.

As described above, since the front-wheel torque distribution ratio and rotation angle θ of clutch shaft 41 in the clutch engagement range have a proportional relationship, rotation angle θ of clutch shaft 41 corresponding to (i.e., proportional to) the target torque distribution ratio is calculated as target angle θ*. A target holding torque T* corresponding to target angle θ* is calculated from the correlation between rotation angle θ of clutch shaft 41 and holding torque T in FIG. 4A.

Referring to FIG. 4B, holding torque T has a substantially proportional relationship with holding current I required to generate holding torque T in electric motor 43. Thus, holding current I corresponding to target holding torque T* can be calculated as a target current I* of electric motor 43 based on the correlation of FIG. 4B. Then, target operation amount D* is calculated as operation amount D required to maintain target current I* supplied to electric motor 43, from a known correlation (e.g., proportional relationship) between operation amount D of electric motor 43 and a resultant current flowing through electric motor 43.

Figure 5:
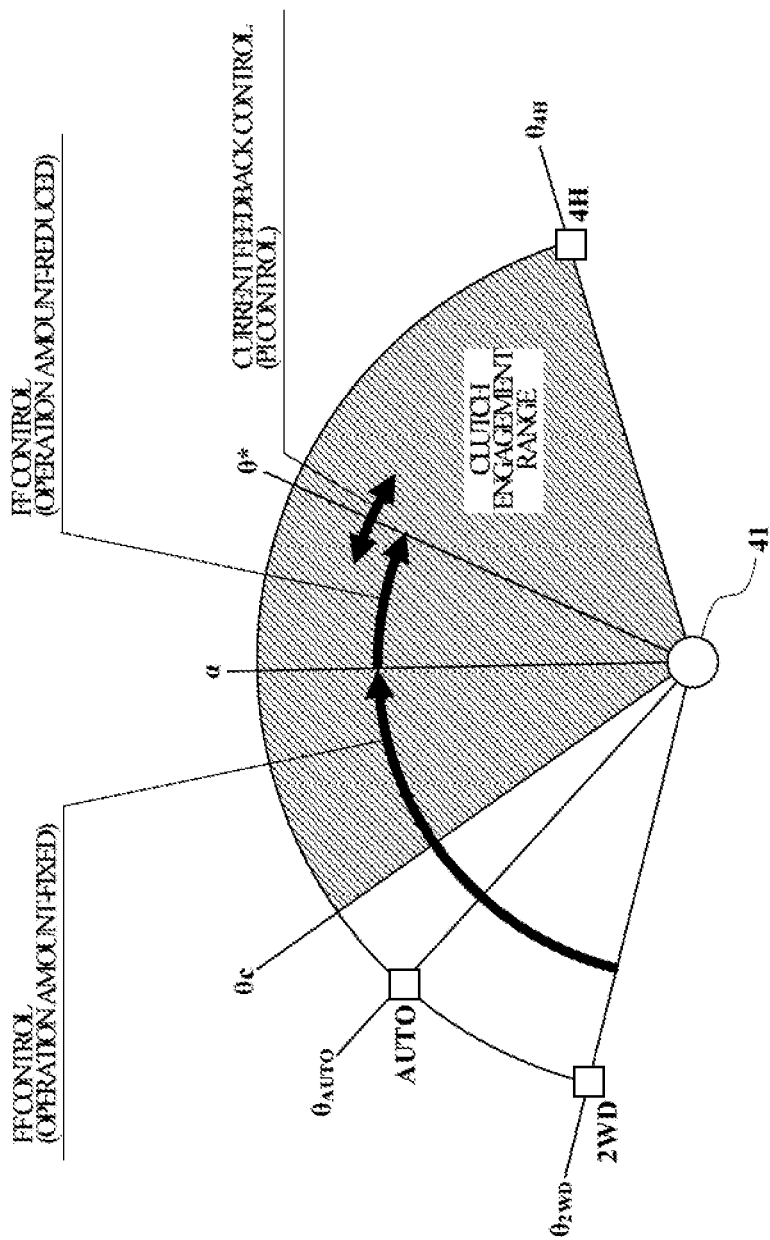
FIG. 5 is a schematic diagram illustrating a range of each control phase according to Embodiment 1.
Figure 6:
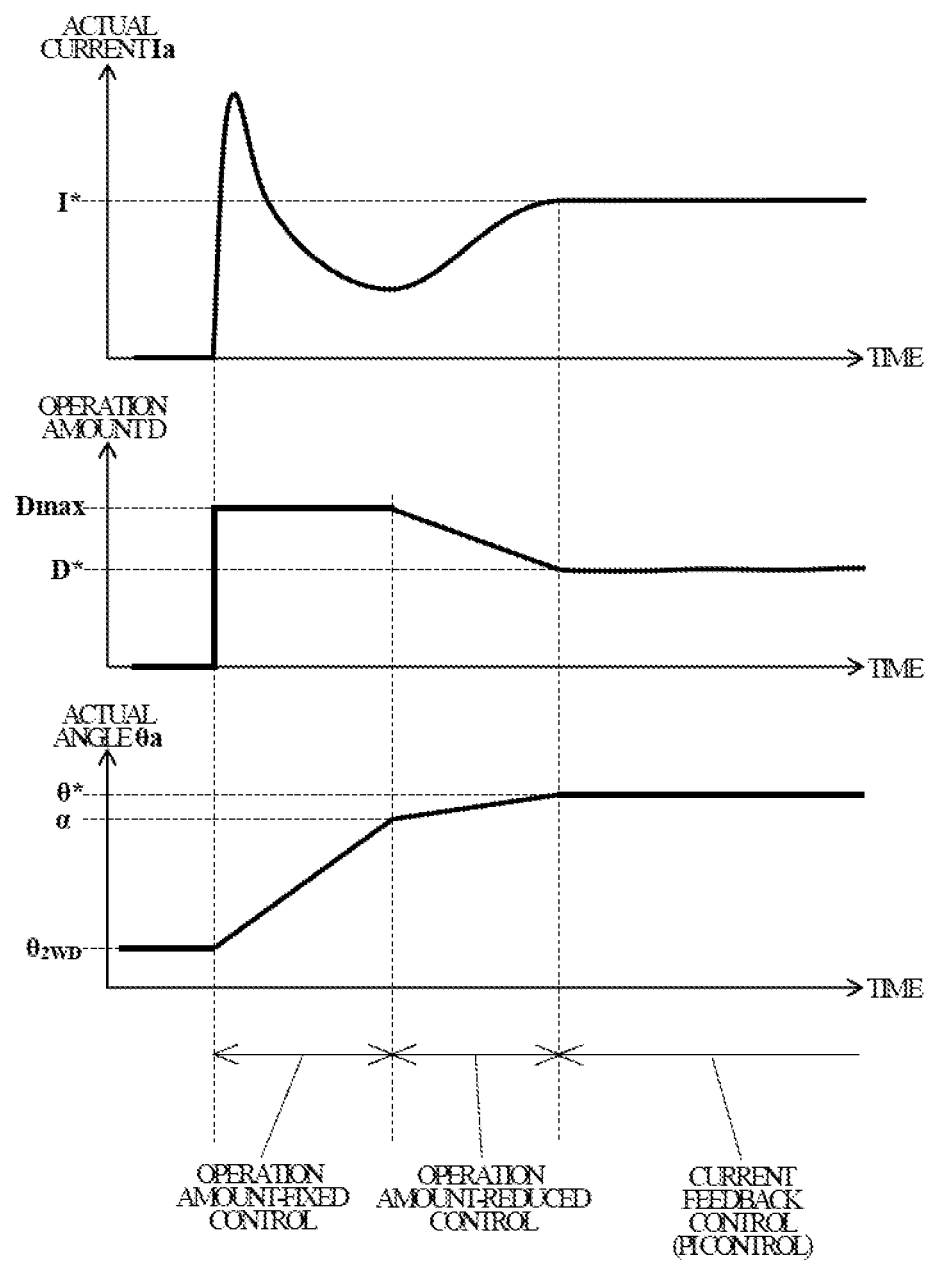
FIG. 6 illustrates explanatory graphs of changes over time of an actual current, an operation amount, and an actual angle according to Embodiment 1.

Referring next to FIG. 5 and FIG. 6, the outline of transfer control with TF-ECU 18 is described. FIG. 5 illustrates a range of control phase upon the transfer control. FIG. 6 illustrates changes over time of a current (hereinafter referred to as "actual current") Ia actually flowing through electric motor 43, operation amount D of electric motor 43, and actual angle θa of clutch shaft 41.

TF-ECU 18 drives clutch shaft 41 using electric motor 43 so as to bring actual current Ia in electric motor 43 closer to target current I* through current feedback control. Here, the current feedback control is performed after actual angle θa reaches a value relatively close to target angle θ*. If actual angle θa is in a range relatively far from target angle θ*, feed forward control (hereinafter referred to as "FF control") is performed in order to improve the responsiveness of transfer 13. Specifically, the FF control includes operation amount-fixed control and operation amount-reduced control.

In operation amount-fixed control, operation amount D of electric motor 43 is fixed to a predetermined value Dmax that is equal to or greater than target operation amount D* until actual angle θa reaches predetermined angle α (<θ*). Predetermined value Dmax can be set to the maximum allowable operation amount, for example, the PWM duty ratio of 100%. In the operation amount-reduced control, after actual angle θa reaches predetermined angle α, operation amount D of electric motor 43 is reduced at a predetermined change rate until it reaches target operation amount D*.

Predetermined angle α and predetermined change rate are set so that a control response time being a time period until actual angle θa converges to target angle θ* is the shortest, that is, so that actual angle θa does not overshoot target angle θ*. For example, predetermined angle α is calculated by adding, to a start angle $θ_0$ (e.g., $θ_{2WD}$) as actual angle θa at the time of newly setting or changing a target torque distribution ratio, a predetermined proportion (e.g., 80%) of a required rotational amount from start angle $θ_0$ to target angle θ*. The above predetermined change rate is set such that, when clutch shaft 41 is rotated from predetermined angle α toward target angle θ* while operation amount D is reduced at this rate from predetermined value Dmax to target operation amount D*, actual angle θa does not overshoot target angle θ*, for example. Of possible combinations of predetermined angle α and the predetermined change rate, a combination that will give the shortest control response time is selected.

When operation amount D reaches target operation amount D*, the operation amount-reduced control is switched to the current feedback control. Since the operation amount-fixed control and the operation amount-reduced control reduce the risk of actual angle θa overshooting target angle θ*, for example, the PI control excluding the calculation of the differential term is applied to the current feedback control.

As described above, the transfer control of TF-ECU 18 basically includes three control phases: a first phase with operation amount-fixed control, a second phase with operation amount-reduced control, and a third phase with current feedback control.

Figure 7:
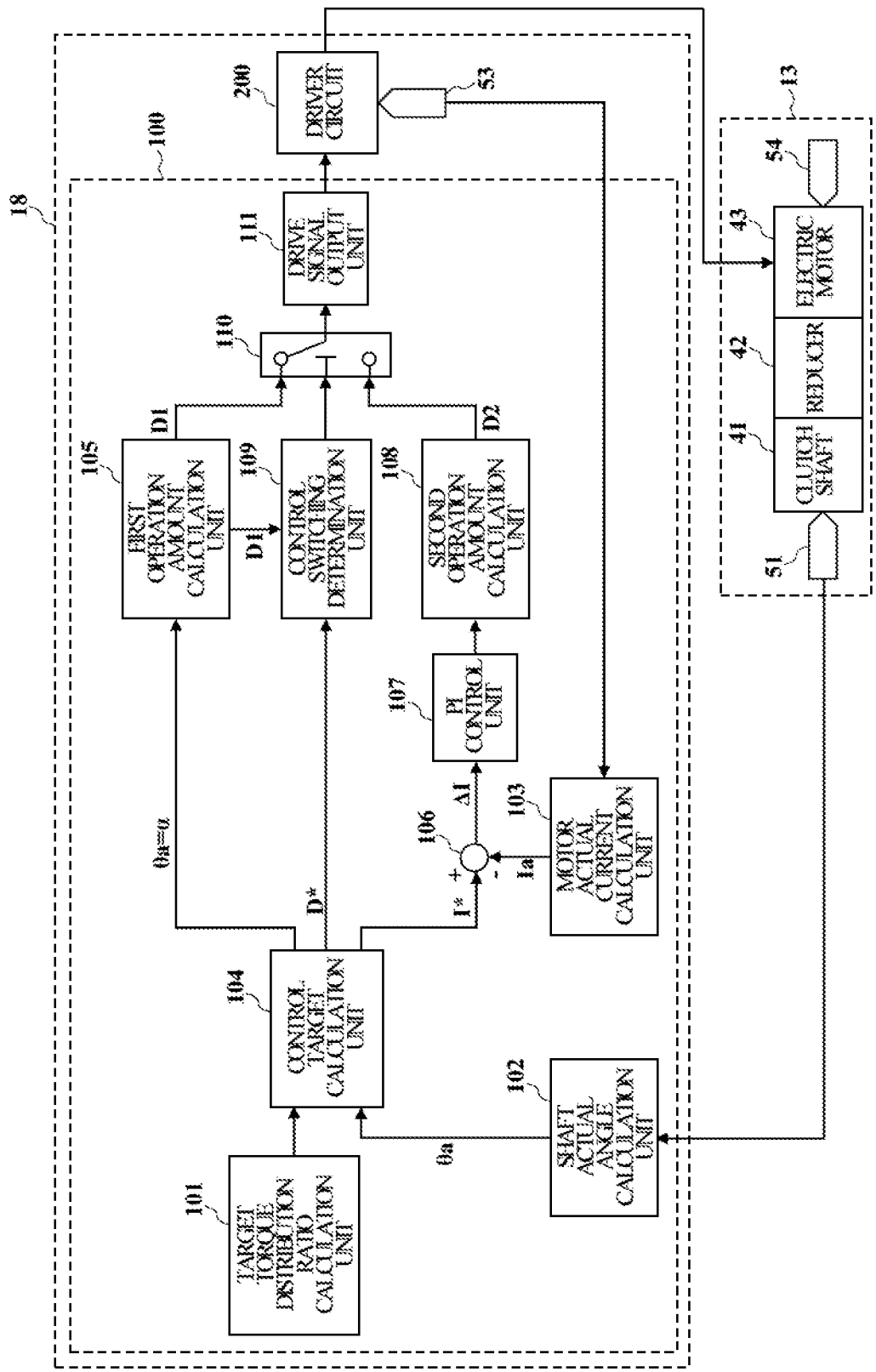
FIG. 7 is a functional block diagram of a microcomputer according to Embodiment 1.
Figure 8:
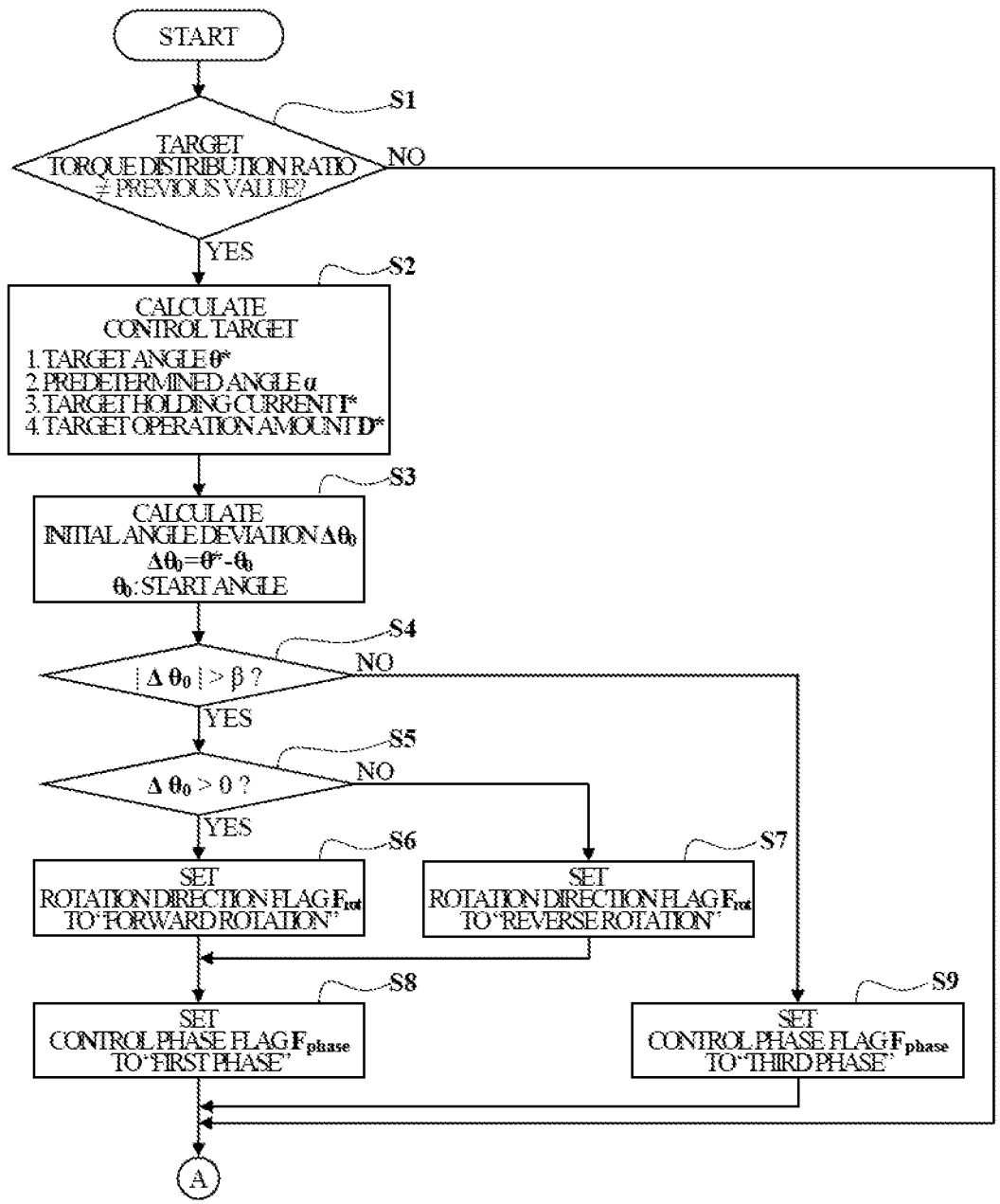
FIG. 8 is a flowchart of transfer control processing according to Embodiment 1.
Figure 9:
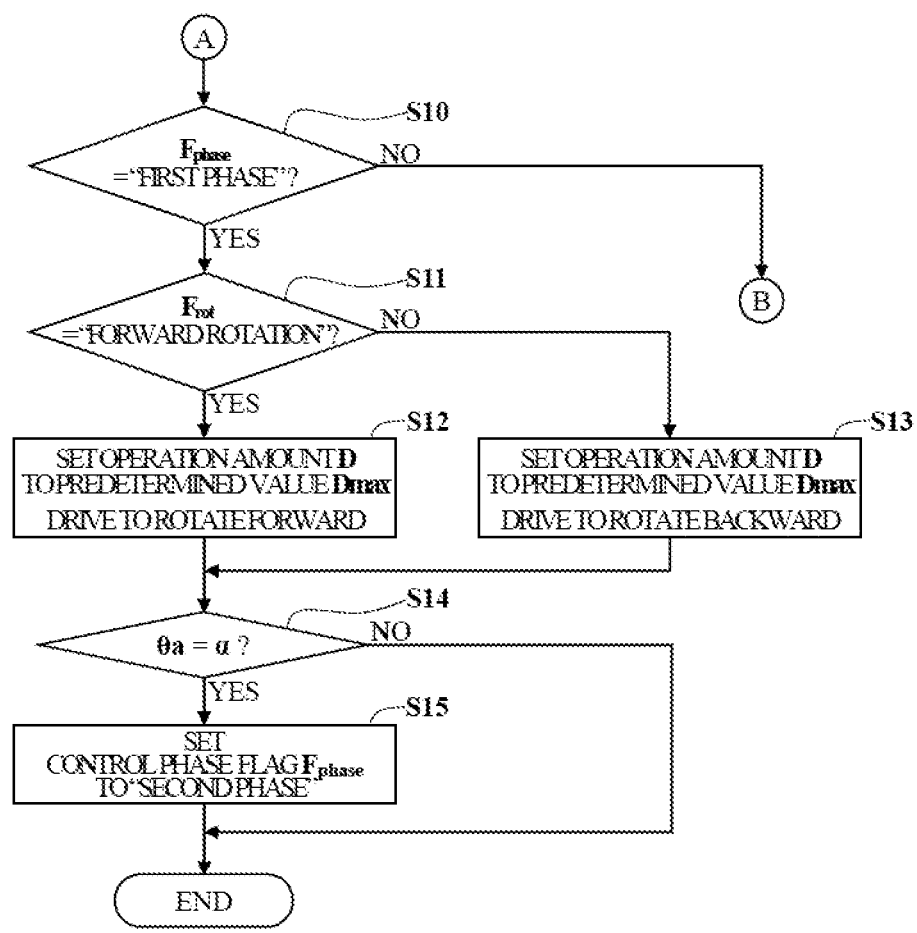
FIG. 9 is a flowchart of the transfer control processing according to Embodiment 1.
Figure 10:
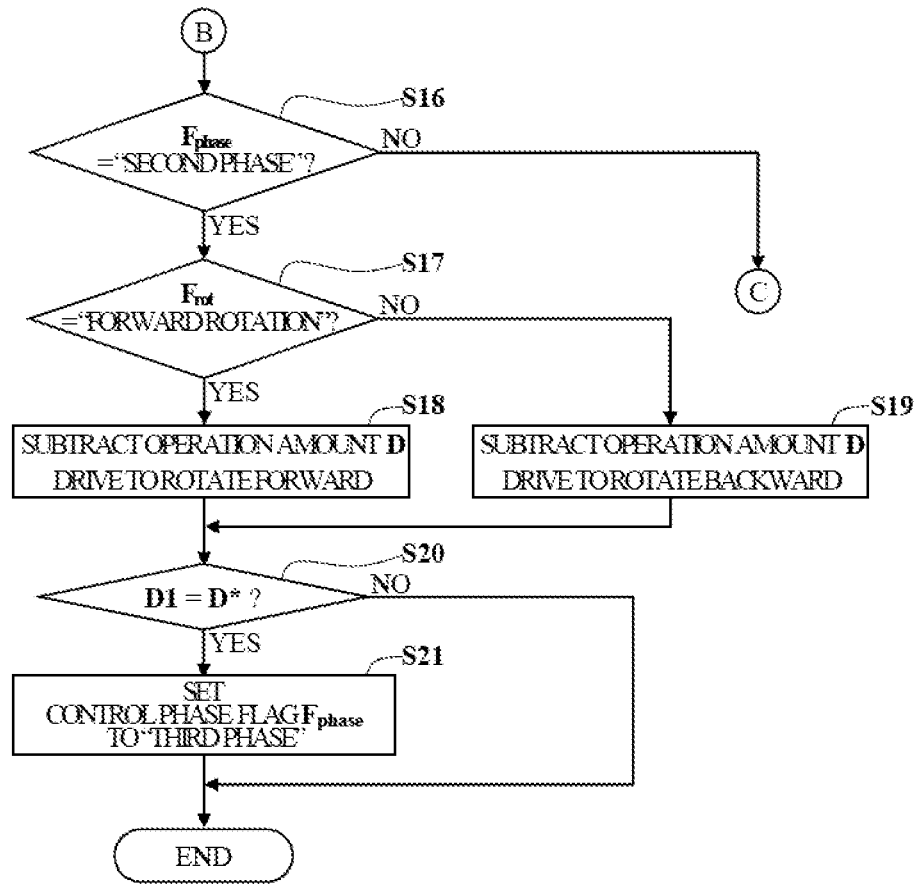
FIG. 10 is a flowchart of the transfer control processing according to Embodiment 1.
Figure 11:
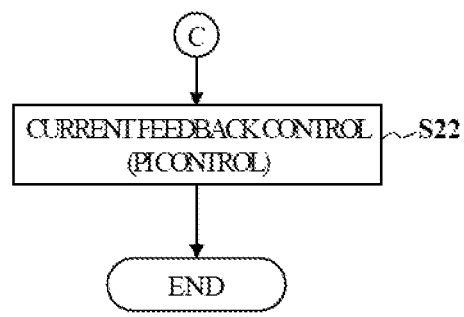
FIG. 11 is a flowchart of the transfer control processing according to Embodiment 1.

FIG. 7 schematically illustrates functional blocks for transfer control of microcomputer 100 in TF-ECU 18.

Microcomputer 100 has, as its functions, a target torque distribution ratio calculation unit 101, a shaft actual angle calculation unit 102, a motor actual current calculation unit 103, a control target calculation unit 104, a first operation amount calculation unit 105, a subtraction unit 106, a PI control unit 107, a second operation amount calculation unit 108, a control switching determination unit 109, a switching unit 110, and a drive signal output unit 111. In the following description, it is assumed that microcomputer 100 exerts the above functions by reading and executing prestored control programs. However, the present invention encompasses cases in which the hardware configuration achieves some or all of the functions.

As described above, target torque distribution ratio calculation unit 101 calculates the target torque distribution ratio based on the various kinds of vehicle information. Shaft actual angle calculation unit 102 calculates actual angle θa of clutch shaft 41 based on an output signal of shaft angle sensor 51. Motor actual current calculation unit 103 calculates a motor current of electric motor 43 based on an output signal of current sensor 53.

As in the conventional technique, control target calculation unit 104 calculates rotation angle θ of clutch shaft 41 corresponding to the target torque distribution ratio as target angle θ*. Moreover, control target calculation unit 104 calculates predetermined angle α used as a reference angle at which operation amount D is started to be gradually reduced out of values of rotation angle θ of clutch shaft 41, and detects an operation amount reduction timing at which actual angle θa calculated by shaft actual angle calculation unit 102 reaches predetermined angle α. Control target calculation unit 104 references the correlation of FIGS. 4A and 4B to calculate target current I* from target angle θ* and thus calculate, as target operation amount D*, operation amount D required to supply target current I* to electric motor 43.

If control target calculation unit 104 has not detected the operation amount reduction timing (θa=α), first operation amount calculation unit 105 sets predetermined value Dmax, for example, the maximum value (PWM duty ratio: 100%) as a first operation amount D1. In contrast, if control target calculation unit 104 detects the operation amount reduction timing (θa=α), first operation amount calculation unit 105 starts gradually reducing first operation amount D1 at a predetermined change rate according to an elapsed time from the detection.

Subtraction unit 106 calculates a deviation ΔI between target current I* and actual current Ia. PI control unit 107 calculates, based on deviation ΔI, the proportional term and the integral term. Second operation amount calculation unit 108 calculates the sum of the proportional term and the integral term as a second operation amount D2.

Control switching determination unit 109 compares first operation amount D1 calculated by first operation amount calculation unit 105 and target operation amount D* calculated by control target calculation unit 104, and generates a switching trigger signal when first operation amount D1 is reduced from predetermined value Dmax to target operation amount D*. The switching trigger signal provides a timing to switch FF control to current feedback control. Switching unit 110 switches operation amount D of electric motor 43 from first operation amount D1 to second operation amount D2 in response to the switching trigger signal generated by control switching determination unit 109. Drive signal output unit 111 generates a drive signal based on operation amount D (e.g., PWM duty ratio) selected by switching unit 110 and outputs it to driver circuit 200 so as to drive electric motor 43.

Here, in order to perform failure diagnosis of the transfer system at the same level as conventional microcomputer 1000, microcomputer 100 is connected to temperature sensor 54 for detecting the temperature of electric motor 43 in addition to current sensor 53 available for shared use between the failure diagnosis and the transfer control. Thus, in microcomputer 100, shaft angle sensor 51 and current sensor 53 are used for the transfer control and current sensor 53 and temperature sensor 54 are used for failure diagnosis. That is, microcomputer 100 uses the three sensors inclusive of shared current sensor 53.

FIG. 8 to FIG. 11 illustrate an example of transfer control processing that is repeatedly executed in microcomputer 100 when the ignition switch of vehicle 10 is turned on to supply power to microcomputer 100.

In Step S1 (abbreviated as "S1" in the drawings; the same applies below), microcomputer 100 determines whether a value (current value) of the target torque distribution ratio calculated by target torque distribution ratio calculation unit 101 is different from a previous calculated value (previous value). Then, if it is determined that the current value is different from the previous value (YES), microcomputer 100 determines that a target torque distribution ratio is newly set or is changed, and advances the processing to Step S2. In contrast, if it is determined that the current value is the same as the previous value (NO), microcomputer 100 determines that the target torque distribution ratio is not changed, so that microcomputer 100 advances the processing to Step S10 so as to continue the transfer control with the previous control phase.

In Step S2, microcomputer 100 causes control target calculation unit 104 to calculate target angle $\theta^*$, predetermined angle $\alpha$, target current I*, and target operation amount D* as described above.

In Step S3, microcomputer 100 calculates an initial angle deviation $\Delta\theta_0$ between target angle $\theta^*$ calculated by control target calculation unit 104 and start angle $\theta_0$ calculated by shaft actual angle calculation unit 102, that is, actual angle $\theta a$.

In Step S4, microcomputer 100 determines whether an absolute value of initial angle deviation $\Delta\theta_0$ calculated in Step S3 is greater than a threshold value $\beta$ (>0). Then, if it is determined that the absolute value of initial angle deviation $\Delta\theta_0$ is greater than threshold value $\beta$ (YES), microcomputer 100 advances the processing to Step S5 so as to perform the operation amount-fixed control. In contrast, if it is determined that the absolute value of initial angle deviation $\Delta\theta_0$ is threshold value $\beta$ or less (NO), microcomputer 100 skips the operation amount-fixed control and the operation amount-reduced control and advances the processing to Step S9 so as to perform current feedback control.

A reason to perform the determination in Step S4 is that, if the operation amount-fixed control and the operation amount-reduced control are performed when actual angle $\theta a$ is already close to target angle $\theta^*$, actual angle $\theta a$ may overshoot target angle $\theta^*$, which adversely affects the responsiveness of transfer 13. Hence, threshold value $\beta$ is set so that when the operation amount-fixed control and the operation amount-reduced control are performed at rotation angle ($\theta^* \pm \beta$), actual angle $\theta a$ does not overshoot target angle $\theta^*$, or even if overshooting occurs, it does not adversely affect the responsiveness of transfer 13. For example, threshold value $\beta$ can be set to a value greater than the rotation angle variations of clutch shaft 41 obtained when operation amount D is decreased from predetermined value Dmax to target operation amount D* at a predetermined change rate under the operation amount-reduced control.

In Step S5, microcomputer 100 determines whether initial angle deviation $\Delta\theta_0$ is a positive value. If it is determined that initial angle deviation $\Delta\theta_0$ is a positive value (YES), actual angle $\theta a$ is less than target angle $\theta^*$ and thus microcomputer 100 determines that clutch shaft 41 has to rotate in direction R1 (see FIG. 2), and advances the processing to Step S6. In contrast, if it is determined that initial angle deviation $\Delta\theta_0$ is a negative value (NO), actual angle $\theta a$ is greater than target angle $\theta^*$ and thus microcomputer 100 determines that clutch shaft 41 has to rotate in direction R2 (see FIG. 2) and advances the processing to Step S7.

In Step S6, in order to rotate clutch shaft 41 in direction R1, microcomputer 100 sets a rotation direction flag $F_{rot}$ indicating the rotation direction of electric motor 43 to a value (e.g., "0") indicating forward rotation. In Step S7, in order to rotate clutch shaft 41 in direction R2, microcomputer 100 sets rotation direction flag $F_{rot}$ to a value (e.g., "1") indicating reverse rotation. Here, rotation direction flag $F_{rot}$ is stored in an internal volatile memory of microcomputer 100.

In Step S8, microcomputer 100 sets a value of a control phase flag $F_{phase}$ indicating a control phase to a value (e.g., "1") indicating the first phase so as to perform the operation amount-fixed control. In Step S9, microcomputer 100 sets the value of control phase flag $F_{phase}$ to a value (e.g., "3") indicating a third phase so as to skip the operation amount-fixed control and the operation amount-reduced control and perform the current feedback control. Here, control phase flag $F_{phase}$ is stored in an internal volatile memory of microcomputer 100.

In Step S10, microcomputer 100 performs the processing as follows. That is, if control phase flag $F_{phase}$ is the value indicating the first phase (YES), microcomputer 100 advances the processing to Step S11, whereas if control phase flag $F_{phase}$ is different from the value indicating the first phase (NO), microcomputer 100 advances the processing to Step S16.

In Step S11, microcomputer 100 performs the processing as follows. That is, if rotation direction flag $F_{rot}$ is the value indicating forward rotation (YES), microcomputer 100 advances the processing to Step S12, whereas if rotation direction flag $F_{rot}$ is the value indicating reverse rotation (NO), microcomputer 100 advances the processing to Step S13.

Microcomputer 100 causes electric motor 43 to rotate forward in Step S12 with operation amount D being fixed to predetermined value Dmax, or causes electric motor 43 to rotate backward in Step S13 with operation amount D being fixed to predetermined value Dmax. Specifically, in microcomputer 100, switching unit 110 selects, as operation amount D, first operation amount D1 fixed to predetermined value Dmax by first operation amount calculation unit 105. Then, drive signal output unit 111 generates a drive signal for forward rotation based on first operation amount D1 in Step S12, or generates a drive signal for reverse rotation based on first operation amount D1 in Step S13, and then outputs the generated drive signal to driver circuit 200.

In Step S14, microcomputer 100 determines whether actual angle θa reaches predetermined angle α. More specifically, microcomputer 100 determines whether actual angle θa increases up to predetermined angle α at the time of rotating electric motor 43 forward, or determines whether actual angle θa decreases down to predetermined angle α at the time of rotating electric motor 43 backward. Then, if it is determined that actual angle θa reaches predetermined angle α (YES), microcomputer 100 advances the processing to Step S15 so as to subsequently perform the operation amount-reduced control. In contrast, if it is determined that actual angle θa has not yet reached predetermined angle α (NO), microcomputer 100 skips Step S15 and exits the transfer control processing and then, returns the processing to Step S1 so as to continue the operation amount-fixed control.

In Step S15, microcomputer 100 sets the value of control phase flag $F_{phase}$ indicating a control phase to a value (e.g., "2") indicating the second phase so as to perform the operation amount-reduced control after the operation amount-fixed control.

In Step S16, microcomputer 100 performs the processing as follows. That is, if control phase flag $F_{phase}$ is the value indicating the second phase (YES), microcomputer 100 advances the processing to Step S17, whereas if control phase flag $F_{phase}$ is a value indicating the third phase (NO), microcomputer 100 advances the processing to Step S22.

In Step S17, microcomputer 100 performs the processing as follows. That is, if rotation direction flag $F_{rot}$ is the value indicating forward rotation (YES), microcomputer 100 advances the processing to Step S18, whereas if rotation direction flag $F_{rot}$ is the value indicating the reverse rotation (NO), microcomputer 100 advances the processing to Step S19.

In Step S18, microcomputer 100 causes electric motor 43 to rotate forward while decreasing operation amount D from a previous value at the predetermined change rate. In Step S19, microcomputer 100 causes electric motor 43 to rotate backward while decreasing operation amount D from the previous value at the predetermined change rate. Specifically, microcomputer 100 causes first operation amount calculation unit 105 to decrease first operation amount D1 from the previous value at the predetermined change rate. Then, switching unit 110 selects first operation amount D1 decreased from the previous value, as operation amount D. Subsequently, drive signal output unit 111 generates a drive signal for forward rotation based on first operation amount D1 in Step S18, or generates a drive signal for reverse rotation based on first operation amount D1 in Step S19, and then outputs the generated drive signal to driver circuit 200.

In Step S20, microcomputer 100 determines whether first operation amount D1 calculated by first operation amount calculation unit 105 decreases down to target operation amount D* calculated by control target calculation unit 104. Then, if it is determined that first operation amount D1 decreases down to target operation amount D* (YES), microcomputer 100 advances the processing to Step S21. In contrast, if it is determined that first operation amount D1 does not decrease down to target operation amount D* (NO), microcomputer 100 skips Step S21 and ends the transfer control processing, and then returns the processing to Step S1.

In Step S21, microcomputer 100 sets a value of control phase flag $F_{phase}$ to the value (e.g., "3") indicating the third phase so as to perform the current feedback control after the operation amount-reduced control.

In Step S22, microcomputer 100 causes switching unit 110 to switch operation amount D from first operation amount D1 to second operation amount D2, and causes drive signal output unit 111 to generate a drive signal based on second operation amount D2 and output the generated drive signal to driver circuit 200. With this operation, microcomputer 100 drives clutch shaft 41 under current feedback control (PI control).

Here, during the operation amount-fixed control and the operation amount-reduced control, microcomputer 100 drives electric motor 43 in a rotation direction indicated by rotation direction flag $F_{rot}$ that is set when a target torque distribution ratio is newly set or is changed. In contrast, during the current feedback control, microcomputer 100 determines whether deviation ΔI between target current I* and actual current Ia is a positive value or a negative value each time deviation ΔI is calculated, so as to determine the rotation direction at the time of driving electric motor 43.

According to such TF-ECU 18, the current feedback control (PI control) is performed after the above operation amount-fixed control and operation amount-reduced control, to drive electric motor 43. Hence, transfer 13 can be controlled without position feedback control that requires high-load interrupt processing for reading, or reducing the noise of, a pulse signal output from motor angle sensor 52, for example. Thus, according to TF-ECU 18, it is possible to control transfer 13 while suppressing reductions in the responsiveness and durability of transfer 13 as well as reducing a control processing load.

Moreover, microcomputer 100 of TF-ECU 18 uses the three sensors for the transfer control and the failure diagnosis of the transfer system as described above. In contrast, microcomputer 1000 of conventional TF-ECU 18z uses shaft angle sensor 51 and motor angle sensor 52 for the transfer control and uses the current sensor 53 and temperature sensor 54 for the failure diagnosis as described above, and thus requires four sensors. Hence, according to microcomputer 100, the number of sensors required for the transfer control and the failure diagnosis can be reduced as compared to conventional microcomputer 1000.

Embodiment 2

Figure 12:
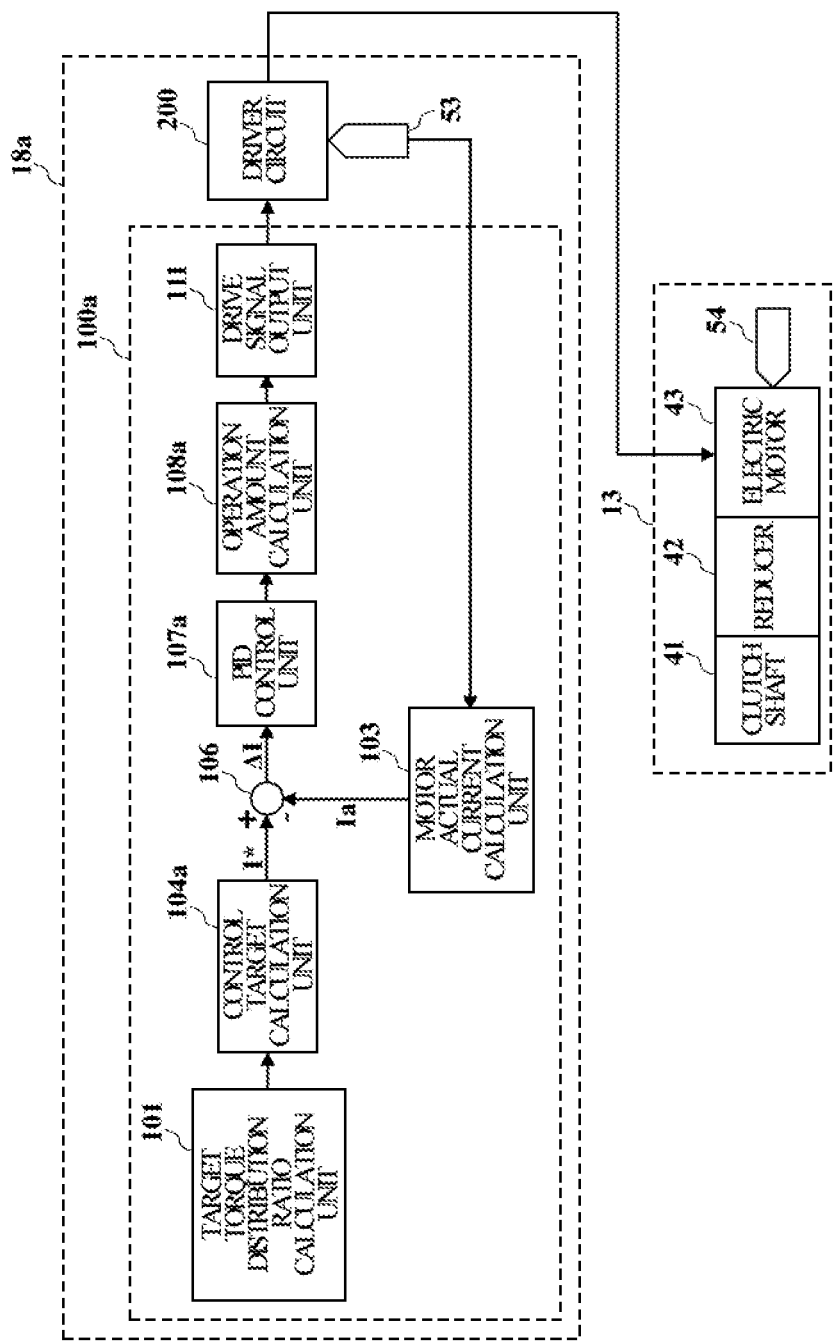
FIG. 12 is a functional block diagram of a microcomputer according to Embodiment 2.

Referring next to FIG. 12, Embodiment 2 of the present invention is described in detail below. FIG. 12 schematically illustrates functional blocks for transfer control of a microcomputer 100a in a TF-ECU 18a according to Embodiment 2. The same components as those of Embodiment 1 are denoted by the same reference symbols and thus are described briefly or are not described.

TF-ECU 18a differs from TF-ECU 18 in that the current feedback control of electric motor 43 is performed in place of the FF control, that is, the operation amount-fixed control and the operation amount-reduced control, to drive clutch shaft 41. Microcomputer 100a of TF-ECU 18a does not require functions of shaft actual angle calculation unit 102, first operation amount calculation unit 105, control switching determination unit 109, and switching unit 110 of microcomputer 100. In addition, microcomputer 100a does not require shaft angle sensor 51 connected to microcomputer 100. Here, under the current feedback control, in order to reduce the risk of overshooting or hunting of actual angle θa with respect to target angle θ*, PID control unit 107a is provided in place of PI control unit 107 to calculate the differential term in addition to the proportional term and the integral term. Moreover, control target calculation unit 104a does not need to calculate predetermined angle α and target operation amount D*.

According to such TF-ECU 18a, the current feedback control (PID control) is performed based on deviation ΔI between target current I* and actual current Ia, to drive electric motor 43. Accordingly, as in Embodiment 1, transfer 13 can be controlled without the position feedback control that requires high-load interrupt processing for reading, or reducing the noise of, a pulse signal output from motor angle sensor 52, for example. Hence, according to TF-ECU 18a, it is possible to control transfer 13 while suppressing reductions in the responsiveness and durability of transfer 13 as well as reducing a control processing load on microcomputer 100a.

In addition, microcomputer 100a of TF-ECU 18a uses two sensors: current sensor 53 for the transfer control and temperature sensor 54 for the failure diagnosis of the transfer system. In contrast, microcomputer 1000 of conventional TF-ECU 18z requires the four sensors as described above. Accordingly, in microcomputer 100a, the number of sensors required for the transfer control and the failure diagnosis can be further reduced as compared to conventional microcomputer 1000.

Note that in Embodiment 1 above, target operation amount D* calculated from target current I* can be corrected according to the ambient temperature of electric motor 43. For example, as the ambient temperature of electric motor 43 increases, a coil resistance of electric motor 43 increases. Thus, target operation amount D* may be corrected to increase according to the increase in ambient temperature of electric motor 43 detected by temperature sensor 54.

According to Embodiment 1 above, during forward rotation of electric motor 43, clutch shaft 41 is rotated against the biasing force of biasing member 38. During reverse rotation of electric motor 43, the rotational force obtained from the biasing force of biasing member 38 is applied in the same direction as the rotation direction of clutch shaft 41, so that actual angle θa is more likely to overshoot target angle θ*. Thus, predetermined angle α used as a timing to gradually reduce the operation amount from operation amount-fixed control to operation amount-reduced control and the predetermined change rate for operation amount D in the operation amount-reduced control can be set differently between the forward rotation and the reverse rotation of electric motor 43. For example, predetermined angle α may be set farther from target angle θ* during reverse rotation of electric motor 43 than during forward rotation, and the predetermined change rate for operation amount D may be set smaller during the reverse rotation of electric motor 43 than during the forward rotation.

In Embodiment 1 above, when actual current Ia converges to target current I*, microcomputer 100 can perform the following abnormality diagnosis. That is, microcomputer 100 can perform abnormality diagnosis on the transfer system by determining whether actual angle θa detected by shaft angle sensor 51 deviates from target angle θ*. For example, if a deviation $Δθ_{Ia=I*}$ of actual angle θa from target angle θ* is a predetermined amount or more, microcomputer 100 determines that the transfer system has an abnormality. As processing to counter the abnormality, microcomputer 100 may return to Step S2 (see FIG. 8) to correct target current I* based on deviation $Δθ_{Ia=I*}$ and also correct target operation amount D*, and then perform the processing in Step S3 and subsequent steps. Moreover, if deviation $Δθ_{Ia=I*}$ is relatively large, microcomputer 100 may limit or stop current supply to electric motor 43. Such abnormality diagnosis and processing to counter the abnormality can be also performed by microcomputer 100a connected to shaft angle sensor 51 in Embodiment 2.

In the above description of Embodiments 1 and 2, it is assumed that transfer 13 has the function of changing the front/rear-wheel torque distribution ratio of the two transmission torques for front wheels 15 and rear wheels 14 from almost 0:100 (rear-wheel drive state) to about 50:50 (four-wheel drive state). However, transfer 13 may have the function of changing a left/right-wheel torque distribution ratio of two transmission torques for left and right wheels of at least either rear wheels 14 or front wheels 15 from almost 0:100 (right-wheel drive state) to about 100:0 (left-wheel drive state) in place of, or in addition to, the above function. Moreover, in the above description, it is assumed that transfer 13 enters the rear-wheel drive state when in the 2WD mode, but transfer 13 may alternatively enter the front-wheel drive state when in the 2WD mode.

The technical ideas described in the above embodiments can be combined as appropriate, unless they conflict. The present invention is described in detail above referring to exemplary embodiments, but it is obvious for those skilled in the art that the present invention encompasses various modifications based on the basic technical ideas and teachings of the present invention.

For example, the configuration of transfer 13 of FIG. 2 is merely given by way of example and can be any configuration as long as the transfer can change a distribution ratio of torque to be distributed from clutch 33 to a predetermined wheel by changing the pressing force with which clutch 33 is pressed by the rotary output shaft of the reducer driven by electric motor 43.

REFERENCE SYMBOL LIST

10 Vehicle
13 Transfer
14 Rear wheel
15 Front wheel
18, 18a TF-ECU
33 Clutch
41 Clutch shaft
42 Reducer
43 Electric motor
51 Shaft angle sensor
53 Current sensor
54 Temperature sensor
100, 100a Microcomputer
101 Target torque distribution ratio calculation unit
102 Shaft actual angle calculation unit
103 Motor actual current calculation unit
104, 104a Control target calculation unit
105 First operation amount calculation unit
106 Subtraction unit
107 PI control unit
107a PID control unit
108 Second operation amount calculation unit
108a Operation amount calculation unit
109 Control switching determination unit
110 Switching unit
111 Drive signal output unit
200 Driver circuit
D Operation amount
D* Target operation amount
Dmax Predetermined value
I* Target current
Ia Actual current θ* Target angle
θa Actual angle
θ₀ Start angle
α Predetermined angle
β Threshold value
Δθ₀ Initial angle deviation
Δθ$_{Ia=I*}$ Deviation of actual angle from target angle when actual current converges

The invention claimed is:

1. A control device for a vehicular transfer which changes a distribution ratio of torque to be distributed from a clutch to a predetermined wheel by changing a pressing force with which the clutch is pressed by a rotary output shaft of a reducer driven by an electric motor,
the control device comprising:
a driver circuit that drives the electric motor;
a current sensor that detects an actual current of the electric motor; and
a control circuit that calculates, when the distribution ratio is newly set or is changed, a holding current, as a target current, that is required to be supplied to the electric motor to maintain the distribution ratio and performs current feedback control by calculating an operation amount of the electric motor so as to adjust the actual current to the target current, and then outputs to the driver circuit a drive signal corresponding to the operation amount.

2. The control device for a vehicular transfer according to claim 1, wherein the control circuit calculates, as a target operation amount, the operation amount required to maintain the target current and fixes the operation amount to a predetermined value equal to or more than the target operation amount, and then performs the current feedback control.

3. The control device for a vehicular transfer according to claim 2, wherein the predetermined value is a maximum operation amount.

4. The control device for a vehicular transfer according to claim 2, wherein the control circuit decreases the operation amount that has been fixed to the predetermined value at a predetermined change rate and starts the current feedback control when the operation amount decreases down to the target operation amount.

5. The control device for a vehicular transfer according to claim 4, further comprising an angle sensor that detects an actual angle of the rotary output shaft of the reducer,
wherein the control circuit further calculates a target angle of the rotary output shaft of the reducer corresponding to the distribution ratio, and a predetermined angle between the target angle and a start angle that is the actual angle obtained when the distribution ratio is newly set or is changed, and
wherein the control circuit fixes the operation amount to the predetermined value until the actual angle reaches the predetermined angle, and decreases the operation amount that has been fixed to the predetermined value at the predetermined change rate when the actual angle reaches the predetermined angle.

6. The control device for a vehicular transfer according to claim 5, wherein in a case in which an initial angle deviation between the target angle and the start angle is at a predetermined threshold value or less, the control circuit performs the current feedback control when the distribution ratio is newly set or is changed.

7. The control device for a vehicular transfer according to claim 5, wherein the control circuit calculates a deviation of the actual angle from the target angle when the actual current converges to the target current under the current feedback control.

8. The control device for a vehicular transfer according to claim 7, wherein the control circuit corrects the target current and the target operation amount based on the deviation.

9. The control device for a vehicular transfer according to claim 2, further comprising a temperature sensor that detects an ambient temperature of the electric motor,
wherein the control circuit corrects the target operation amount according to the ambient temperature.

10. The control device for a vehicular transfer according to claim 2, wherein PI control is applied to the current feedback control.

11. The control device for a vehicular transfer according to claim 1, wherein PID control is applied to the current feedback control.

* * * * *